(12) United States Patent
Bell

(10) Patent No.: US 10,054,472 B1
(45) Date of Patent: Aug. 21, 2018

(54) FLUID FLOW METER

(71) Applicant: Joel David Bell, Katy, TX (US)

(72) Inventor: Joel David Bell, Katy, TX (US)

( * ) Notice: Subject to any disclaimer, the term of this patent is extended or adjusted under 35 U.S.C. 154(b) by 26 days.

(21) Appl. No.: 15/420,157

(22) Filed: Jan. 31, 2017

(51) Int. Cl.
*G01F 1/42* (2006.01)

(52) U.S. Cl.
CPC ..................................... *G01F 1/42* (2013.01)

(58) Field of Classification Search
CPC ..... G01F 1/42; G01F 1/00; G01F 1/37; G01F 1/34
See application file for complete search history.

(56) References Cited

U.S. PATENT DOCUMENTS

| | | | |
|---|---|---|---|
| 1,480,661 A * | 1/1924 | Brown ....................... | G01F 1/42 138/44 |
| 2,044,806 A * | 6/1936 | Naiman ..................... | G01F 1/48 137/599.13 |
| 4,926,698 A * | 5/1990 | Owen ........................ | G01F 1/42 73/861.61 |
| 5,036,884 A * | 8/1991 | Miller ....................... | G01F 1/36 137/270 |
| 5,814,738 A * | 9/1998 | Pinkerton ................. | G01F 1/3218 73/861.22 |
| 7,357,040 B2 | 4/2008 | Bell | |
| 7,721,764 B2 * | 5/2010 | Louwagie ................. | F16K 1/04 137/597 |
| 7,819,022 B2 * | 10/2010 | Hope ........................ | G01F 1/40 73/861.52 |
| 7,832,283 B2 * | 11/2010 | Peters ...................... | G01F 15/00 73/861.52 |
| 7,942,061 B2 * | 5/2011 | Weingarten ............... | G01F 1/40 73/700 |
| 8,166,801 B2 | 5/2012 | Sinha | |
| 8,756,990 B2 * | 6/2014 | Speldrich ............. | B29C 45/0025 73/273 |
| 9,857,209 B2 * | 1/2018 | Ishihara ................... | G01F 1/34 |

* cited by examiner

*Primary Examiner* — Jewel V Dowtin
(74) *Attorney, Agent, or Firm* — Shawn Hunter

(57) ABSTRACT

A fluid flow meter includes a flow meter body with a central flow passage and flow restriction opening defined therein. Fluid pressure is measured at the flow restriction opening and compared to fluid pressure measured at an upstream point. An annular flow region is defined within the flow meter body radially between the flow restriction opening and a pressure detection port.

17 Claims, 4 Drawing Sheets

US 10,054,472 B1

FLUID FLOW METER

BACKGROUND OF THE INVENTION

1. Field of the Invention

The invention relates generally to devices and methods for measuring the volume of fluid flowing through a flowbore.

2. Description of the Related Art

Flow meters are used to measure the volume of fluid flow through a flowbore. Flow meters are widely used in many industries for many types of fluids. A torus wedge flow meter is described in U.S. Pat. No. 7,357,040 entitled "Torus Wedge Flow Meter" issued Apr. 15, 2008. This patent is commonly owned with the present application and is herein incorporated by reference in its entirety.

SUMMARY OF THE INVENTION

The invention provides devices and methods for measuring the volume of fluid flow through a flowbore. A fluid flow meter is described which includes a flow meter body which defines a central flow passage along its axial length. The central flow passage has a flow restriction opening which provides a point of maximum reduced flow area for the central flow passage. A pressure measurement port is formed within the flow meter body and is in fluid communication with the flow restriction opening to allow fluid pressure at the flow restriction opening to be measured. Upstream and downstream angled faces extend away from the flow restriction opening within the central flow passage.

In described embodiments, an annular flow region is defined within the flow meter body radially between the flow restriction opening and the pressure measurement port. The annular flow region serves to provide an average pressure reading for the flow restriction opening. Preferably, multiple pressure communication ports are provided within the flow meter body to allow fluid communication with the flow restriction opening.

In operation, the fluid flow meter is incorporated into the flowbore of a pipeline or the like. As fluid is flowed through the flowbore, fluid pressure is measured at the fluid restriction opening of the flow meter and is compared to fluid pressure measured at a point upstream of the fluid restriction opening. The pressure differential can be used to determine the volume of fluid flow through the flow bore.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

Figure 1:
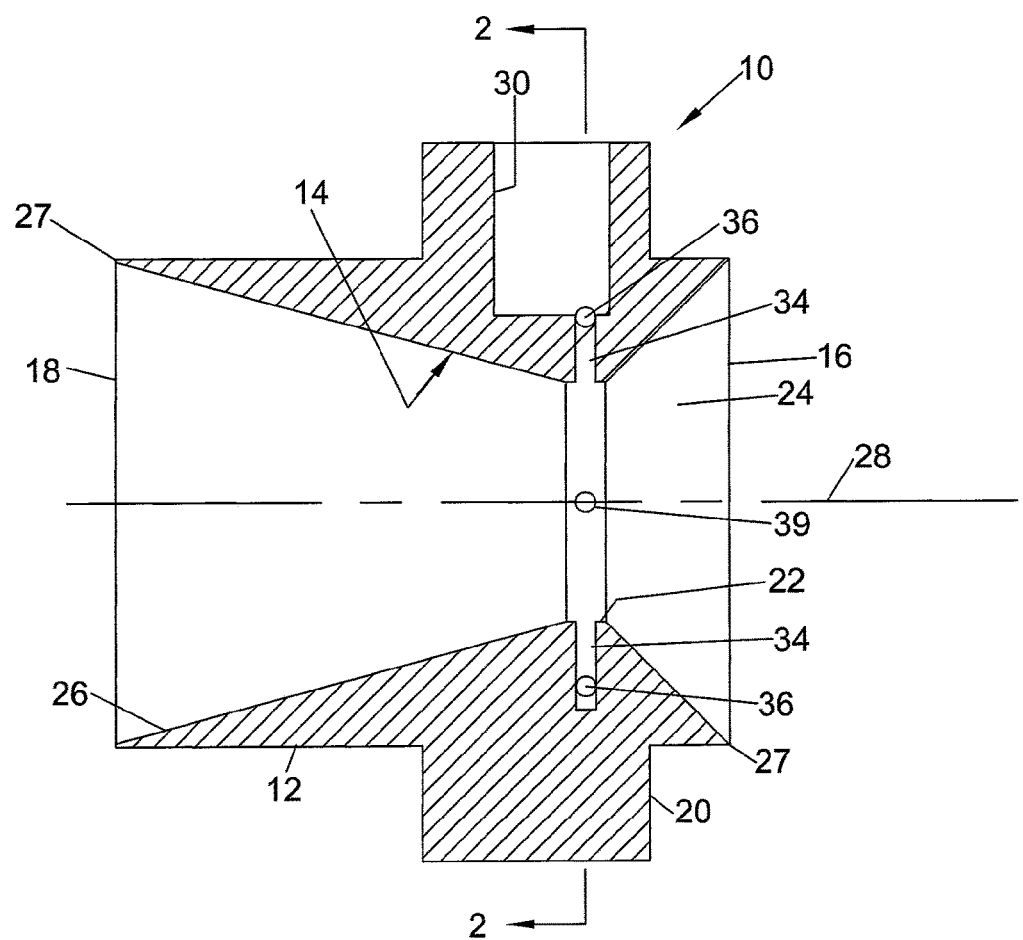
FIG. 1 is a side, cross-sectional view of an exemplary fluid flow meter constructed in accordance with the present invention.
Figure 2:
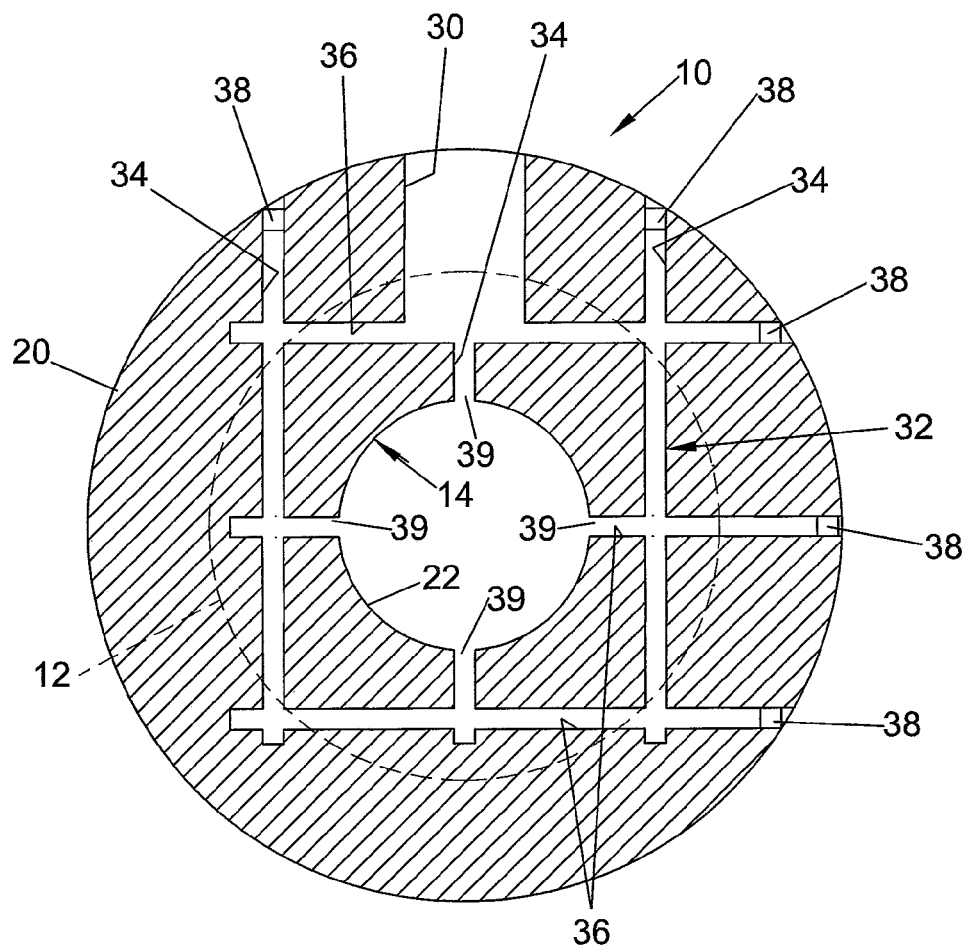
FIG. 2 is a cross-section taken along lines 2-2 in FIG. 1.

FIGS. 1 and 2 depict an exemplary fluid flow meter 10 constructed in accordance with the present invention. The flow meter 10 includes a generally cylindrical flow meter body 12 having a central flow passage 14 which extends through the body 12 from upstream axial end 16 to downstream axial end 18. The flow meter body 12 is preferably formed of a suitable rigid material, such as stainless steel or composite. Preferably, an enlarged diameter flange 20 extends radially outwardly from the body 12.

The central flow passage 14 features a reduced diameter flow restriction opening 22. The flow restriction opening 22 is adjoined by an annular upstream angled face 24 and an annular downstream angled face 26. The flow restriction opening 22 provides the point of maximum reduced flow area for the central flow passage 14. The upstream angled face 24 serves to condition the flow and act as a flow stream profiler. The upstream angled face 24 preferably forms an angle of approximately 45 degrees with the axis 28 of the flow meter body 12. However, other suitable angles might also be used. The downstream angled face 26 preferably forms an angle of approximately 15 degrees with the axis 28. Preferably, each of the upstream and downstream angled faces 24, 26 extends from the flow restriction opening 22 radially outwardly to the outer radial periphery 27 of the flow meter body 12.

A pressure detection port 30 is formed within the flange 20 of the flow meter body 12 and is in fluid communication with the central flow passage 14 via an annular flow region, generally indicated at 32 in FIG. 2. The annular flow region 32 allows fluid flow and pressure communication within the flow meter body 12 radially surrounding the flow restriction opening 22 of the central flow passage 14. In the depicted embodiment, the annular flow region 32 is formed by a plurality of blind bores that are formed within the flow meter body 12. A first set of blind bores 34 enter from the radial top of the flow meter body 12 (as shown in FIG. 2) and terminate within the lower portion of the flow meter body 12. A second set of blind bores 36 is disposed at 90 degree angles with respect to the first set of blind bores 34. Plugs 38 are used to close off the blind bores 34, 36. The first and second sets of blind bores 34, 36 intersect one another to form the annular flow region 32. Preferably, the annular flow region 32 permits fluid flow and pressure communication within a complete annular region (360 degrees) surrounding the flow restriction opening 22.

As can be best seen in FIGS. 1-2, the pressure detection port 30 is in fluid communication with the annular flow region 32 such that fluid pressure within the annular flow region 32 will also be the fluid pressure at the pressure detection port 30. In addition, the annular flow region 32 is in fluid communication with the flow restriction opening 22 of the fluid flow meter 10 via pressure communication ports 39. There are preferably multiple pressure communication ports 39 at the flow restriction opening 22 and they are angularly spaced apart from each other about the circumference of the flow restriction opening 22 by about 90 degrees.

Figure 3:
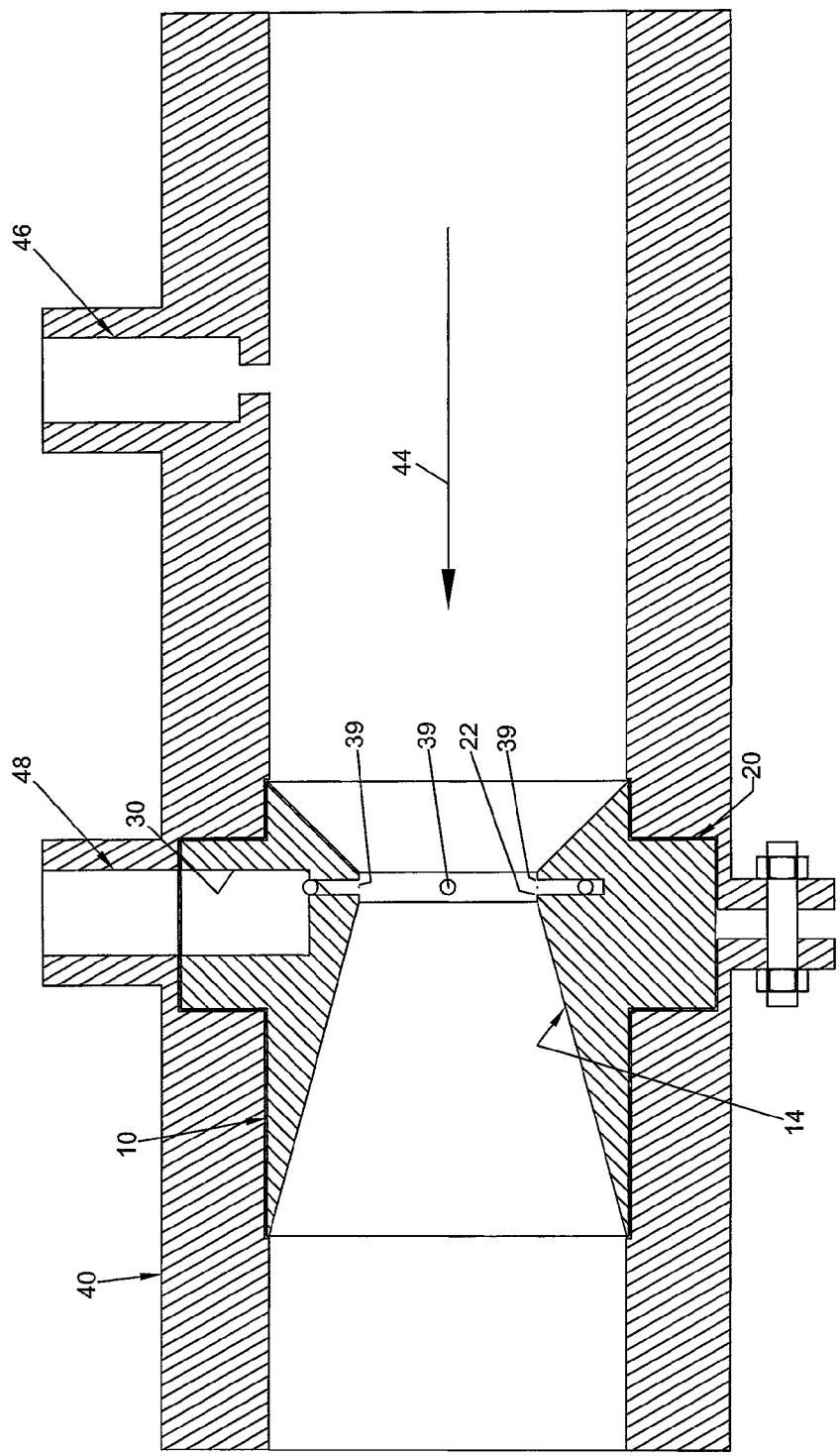
FIG. 3 is a side, cross-sectional view of an exemplary pipeline which includes the flow meter shown in FIGS. 1-2.

FIG. 3 illustrates a fluid flow meter 10 disposed within a pipeline 40 and being used to measure a volume of fluid flow through the pipeline 40. Pipeline 40 defines a flowbore 42 along its length. In the depicted embodiment, fluid flow is in the direction of arrow 44. The flange 20 is used to secure the fluid flow meter 10 within the pipeline 40. Pipeline 40 includes an upstream port connection 46 and a downstream port connection 48. The downstream port connection 48 is aligned with the pressure detection port 30 of the fluid flow meter 10 when assembled. Port connections 46, 48 are used to associate a pressure gauge or pressure transmission tube for connection to a pressure gauge. The construction and use of port connections such as connections 46, 48 is well known and therefore will not be further described in detail here.

The measured pressure difference between the two port connections 46, 48 can be used to determine the volume of fluid flow through the flowbore 42 of the pipeline 40. Conventional arrangements measure the downstream fluid pressure at a location downstream of the flow restriction. In preferred embodiments of the present invention, however, the downstream pressure is measured at the flow restriction itself—in particular, at flow restriction opening 22. Measurement of the downstream pressure at the flow restriction opening 22 allows the highest pressure differential to be measured. The inventor has found that measurement of the downstream pressure at the flow restriction opening 22 provides more accurate fluid flow volume measurement. In particular, the inventor has determined that measurement at the flow restriction opening 22 will provide a greater differential pressure measurement and leads to more accurate measurements. In addition, the use of an annular flow region 32 surrounding the flow restriction opening 22 will provide an average pressure reading for fluid pressure at the flow restriction opening 22. The multiple pressure communication ports 39, which are spaced at intervals about the circumference of the fluid restriction opening 22, may have different flow energies and/or pressures between them. The annular flow region 32 is in fluid communication with each of these pressure communication ports 39 and will therefore provide an average pressure experienced at each of the pressure communication ports 39. The flow restriction opening 22 is preferably circular in shape. The circumference of the flow restriction opening 22 preferably lies parallel to the axis 28 of the flow meter body 12.

Figure 4:
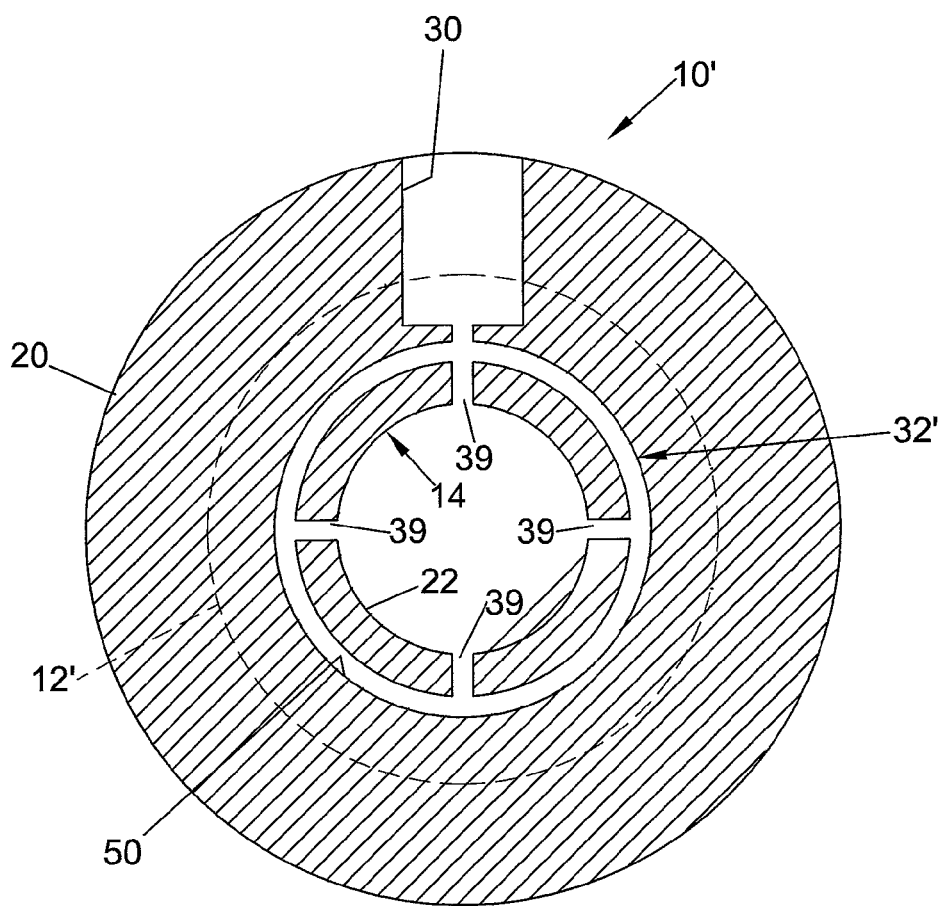
FIG. 4 is a side, cross-sectional view of an alternative embodiment for a flow meter constructed in accordance with the present invention.

It is noted that, while blind bores 34, 36 are shown in the depicted embodiment, techniques other than drilling blind bores may be used to form the annular flow region within the flow meter body 12. FIG. 4 illustrates an exemplary flow meter 10' in which the annular flow region 32' is a circular channel 50 which radially surrounds the flow restriction opening 22. Pressure communication ports 39 communicate the central flow passage 14 with the circular channel 50. The circular channel 50 is also in fluid communication with the pressure detection port 30.

The fluid flow body 12' might be made of separable halves and an annular half of the circular channel might be formed in each half of the fluid flow body 12'. When assembled, a complete circular channel is formed. It is also noted that a unitary fluid flow body 12' having the depicted design might be constructed using additive manufacturing (aka 3D printing) techniques known in the art. Suitable materials could include metal and composite. It is also noted that the annular flow region 32' might have non-circular shape so long as it performs the functions of providing fluid/pressure communication between the pressure communication ports 39 and the pressure detection port 30.

Those of skill in the art will recognize that numerous modifications and changes may be made to the exemplary designs and embodiments described herein and that the invention is limited only by the claims that follow and any equivalents thereof.

What is claimed is:

1. A fluid flow meter comprising:
   a flow meter body which defines a central flow passage defined between an axial upstream end and an axial downstream end;
   a flow restriction opening within the central flow passage, the flow restriction opening providing a point of maximum reduced flow area within the central flow passage;
   an annular flow region defined within the flow meter body radially surrounding the flow restriction opening, the annular flow region being in fluid communication with the central flow passage, the annular flow region permitting fluid flow and pressure communication within a complete annular region surrounding the flow restriction opening; and
   a pressure detection port within the flow meter body and in fluid communication with the annular flow region.

2. The fluid flow meter of claim 1 wherein the annular flow region is in fluid communication with the flow restriction opening of the central flow passage.

3. The fluid flow meter of claim 1 wherein an annular upstream angled face extends from the flow restriction opening to an outer radial periphery of the flow meter body.

4. The fluid flow meter of claim 1 wherein an annular downstream angled face extends from the flow restriction opening to an outer radial periphery of the flow meter body.

5. The fluid flow meter of claim 3 wherein the annular upstream angled face lies at an angle of about 45 degrees with respect to an axis of the flow meter body.

6. The fluid flow meter of claim 4 wherein the annular downstream angled face lies at an angle of about 15 degrees with respect to an axis of the flow meter body.

7. The fluid flow meter of claim 1 wherein the annular flow region is made up of a plurality of blind bores formed within the flow meter body.

8. The fluid flow meter of claim 1 wherein the annular flow region is a circular channel formed within the flow meter body.

9. A fluid flow meter comprising:
   a flow meter body which defines a central flow passage defined between an axial upstream end and an axial downstream end;
   a flow restriction opening within the central flow passage, the flow restriction opening providing a point of maximum reduced flow area within the central flow passage; and
   a pressure detection port within the flow meter body and in fluid communication with the flow restriction opening to allow detection of fluid pressure within the flow restriction opening.

10. The fluid flow meter of claim 9 further comprising:
    an annular flow region formed within the flow meter body and in fluid communication with the pressure detection port and the flow restriction opening to communicate fluid pressure to the pressure detection port from the flow restriction opening, the annular flow region being operable to average the fluid pressure around the flow restriction opening.

11. The fluid flow meter of claim 9 wherein an annular upstream angled face extends from the flow restriction opening to an outer radial periphery of the flow meter body.

12. The fluid flow meter of claim 9 wherein an annular downstream angled face extends from the flow restriction opening to an outer radial periphery of the flow meter body.

13. The fluid flow meter of claim 11 wherein the annular upstream angled face lies at an angle of about 45 degrees with respect to an axis of the flow meter body.

14. The fluid flow meter of claim 12 wherein the annular downstream angled face lies at an angle of about 15 degrees with respect to an axis of the flow meter body.

15. The fluid flow meter of claim 10 wherein the annular flow region is made up of a plurality of blind bores formed within the flow meter body.

16. The fluid flow meter of claim 9 wherein the annular flow region is a circular channel formed within the flow meter body.

17. A method of measuring volume of fluid flowing through a flowbore, the method comprising the steps of:
   securing a fluid flow meter within the flowbore having a first pressure measurement port, the fluid flow meter having a flow meter body which defines a central flow passage defined between an axial upstream end and an axial downstream end, a flow restriction opening within the central flow passage, the flow restriction opening providing a point of maximum reduced flow area within the central flow passage and a pressure detection port within the flow meter body and in fluid communication with the flow restriction opening;
   flowing fluid through the flowbore and the flow restriction opening of the fluid flow meter;
   detecting fluid pressure at the flow restriction opening and a point upstream of the flow restriction opening; and
   calculating the volume of fluid passing through the flowbore based upon the measured pressures.

* * * * *